US010758870B2

(12) United States Patent
Blanke et al.

(10) Patent No.: US 10,758,870 B2
(45) Date of Patent: Sep. 1, 2020

(54) CERAMIC MEMBRANE MODULE WITH EXTERNAL FRAME ASSEMBLY AND RELATED METHODS

(71) Applicant: NANOSTONE WATER GMBH, Halberstadt (DE)

(72) Inventors: Thomas Blanke, Harsleben (DE); Bernd Koecher, Wegeleben (DE); Paul Osmundson, Ames, IA (US)

(73) Assignee: Nanostone Water GmbH, Halberstadt (DE)

( * ) Notice: Subject to any disclaimer, the term of this patent is extended or adjusted under 35 U.S.C. 154(b) by 178 days.

(21) Appl. No.: 16/093,801

(22) PCT Filed: Apr. 5, 2017

(86) PCT No.: PCT/EP2017/058161
§ 371 (c)(1),
(2) Date: Oct. 15, 2018

(87) PCT Pub. No.: WO2017/182276
PCT Pub. Date: Oct. 26, 2017

(65) Prior Publication Data
US 2019/0060836 A1 Feb. 28, 2019

(30) Foreign Application Priority Data

Apr. 22, 2016 (DE) .................. 10 2016 107 534

(51) Int. Cl.
*B01D 63/02* (2006.01)
*B01D 71/02* (2006.01)
(52) U.S. Cl.
CPC .......... *B01D 63/022* (2013.01); *B01D 63/02* (2013.01); *B01D 71/02* (2013.01); *B01D 71/024* (2013.01);
(Continued)

(58) Field of Classification Search
CPC ............ B01D 2313/04; B01D 2313/06; B01D 2313/56; B01D 63/02; B01D 63/022; B01D 71/02; B01D 71/024
See application file for complete search history.

(56) References Cited

U.S. PATENT DOCUMENTS

2004/0144712 A1  7/2004  Stroh et al.
2004/0183228 A1  9/2004  Stillig
(Continued)

FOREIGN PATENT DOCUMENTS

DE        19900432        7/2000
DE     102011080763       2/2013
(Continued)

OTHER PUBLICATIONS

International Search Report and Written Opinion in corresponding Application No. PCT/EP2017/058161, dated Jun. 1, 2017, pp. 1-8.
(Continued)

*Primary Examiner* — Dirk R Bass
(74) *Attorney, Agent, or Firm* — Fish & Richardson P.C.

(57) ABSTRACT

A method for forming a ceramic membrane module system includes disposing at least one membrane (118) within a housing (120), the membrane (118) having capillaries therein. The method includes sealing the first housing end (122) and capillaries, applying force to the removable gasket (122) and capillaries, applying force to the removable gasket with an external frame assembly (200), and disposing potting material into the housing (120) without plugging the capillaries with the potting.

20 Claims, 4 Drawing Sheets (52) U.S. Cl.
CPC ...... *B01D 2313/04* (2013.01); *B01D 2313/06* (2013.01); *B01D 2313/56* (2013.01)

(56) References Cited

U.S. PATENT DOCUMENTS

2009/0277826 A1   11/2009   Pedersen et al.
2013/0153485 A1   6/2013    Goebbert et al.
2014/0251893 A1   9/2014    Goebbert et al.

FOREIGN PATENT DOCUMENTS

WO   WO 00/40325    7/2000
WO   WO 03/051495   6/2003

OTHER PUBLICATIONS

Examination Report in German Application No. 10 2016 107 534.5, dated Dec. 5, 2016, pp. 1-5.

CERAMIC MEMBRANE MODULE WITH EXTERNAL FRAME ASSEMBLY AND RELATED METHODS

TECHNICAL FIELD

A ceramic membrane module with external drive compression and related methods.

TECHNICAL BACKGROUND

Many waters contain contaminants that can present a hazard to people or the environment, or make further processing, such as evaporation or reverse osmosis more difficult. Membranes are commonly used to remove such contaminants. Membrane elements are typically made of plastics, polymers or ceramics, both of which are frequently placed inside a housing to contain the pressurized fluid to be treated. The element and housing combination are referred to as membrane modules or modules. Such housings also provide separate ports to allow a feed to enter the module, filtrate to exit after being processed through the membrane, and a retentate for removal of the filtered material.

Ceramic membranes are commonly used as a multilayer structure with a relatively high permeability support, and a thinner separation layer which enables the separation by passing some components (typically water and small solutes) while retaining others. In order to increase surface area a number of channels are typically present in the support, each with a coating. In one example of a use of the membrane, feed enters these channels before passing through the membrane into the support structure. In other examples, the coasting is on an outside surface, and feed enters from the outside and flows inward to the channels. To keep feed from passing directly into the support on either end, a face end seal layer is used to prevent transport through the ends. Commonly used materials for face end seals include epoxies, polyurethanes, elastomers, glass or other suitable materials. In comparison to the other components in a ceramic housing this face end seal is particularly sensitive to mechanical damage due to both the material properties of the face end seal, and the fact that housings which have been used to date leave the face end seal at the end of the housing preventing it from serving as shielding. What is needed is a module design allowing the housing to protect, shield, and/or create an impingement zone or buffer space around the face end seal improving the durability and integrity of the membrane.

Further, ceramic membrane modules are typically heavy and require mechanical support. Conventional ceramic housings require the ceramic in the housing to be supported so that the external end caps which are affixed to the bottom of the housing can be installed before use, or removed while in a system to access the ceramic, for instance to determine whether damage to the face end seal has occurred. This requires a method to support the weight of the ceramic above the ground, which makes routine inspections difficult to perform. This can be accomplished by recessing the element inside the housing. However to do so there is a need for a process to provide potting material to seal the element to the housing, while preventing the potting material from flowing over the end of the module and blocking channels. What is needed is a process to position the module within the housing and seal the channel area on the end of the element so that potting material can be applied to mount the element within the housing without blocking channels.

SUMMARY

A method for forming a ceramic membrane module system includes disposing a membrane within a housing, where the housing has a first housing end and a second housing end, and the membrane has capillaries therein, where the capillaries extend from at least a first end of the membrane. The membrane may be recessed from at least one of the first or second housing ends.

The method further includes disposing a resistant spacer near the first end of the membrane and temporarily sealing the capillaries, disposing at least one end plate in the housing near the spacer, where the at least one end plate has a removable gasket.

The method still further includes sealing the first housing end with the removable gasket and forming a seal, applying force to the removable gasket with a pressure plate, disposing potting material into the housing without plugging the capillaries with the potting, and removing the end plate and gasket from the housing.

These and other embodiments, aspects, advantages, and features of the present invention, in particular a formation assembly, will be set forth in part in the description which follows, and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized or structural or logical changes may be made without departing from the scope of the invention. The following detailed description is, therefore, not to be taken in a limiting sense and the scope of the invention is defined by the appended claims and their legal equivalents.

In this document, the terms "a" or "an" are used to include one or more than one, and the term "or" is used to refer to a nonexclusive "or" unless otherwise indicated. In addition, it is to be understood that the phraseology or terminology employed herein, and not otherwise defined, is for the purpose of description only and not of limitation.

Figures 4A, 4D:
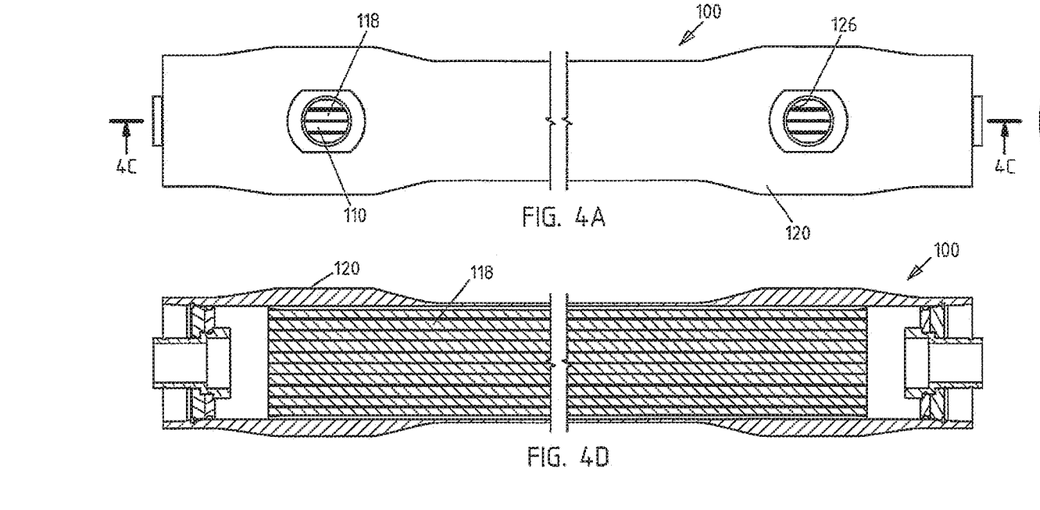
FIG. 4A illustrates a side view of a filtration assembly according to one or more embodiments.
FIG. 4D illustrates a cross-sectional view of a filtration assembly taken along 4D-4D according to one or more embodiments.
Figure 4B:
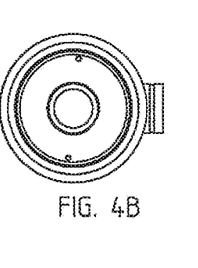
FIG. 4B illustrates an end view of a filtration assembly according to one or more embodiments.
Figure 4C:
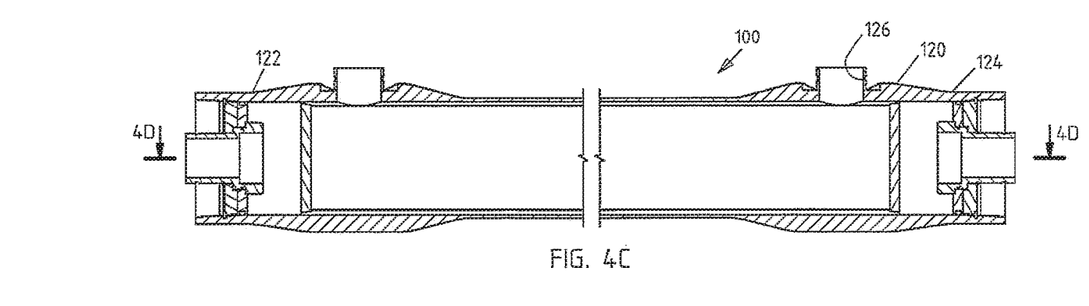
FIG. 4C illustrates a cross-sectional view of a filtration assembly taken along 4C-4C according to one or more embodiments.

An external frame assembly and related methods are described herein, and are used to partially or fully assemble a filtration assembly. The filtration assembly including a ceramic membrane system is shown in FIGS. 4A, 4B, and 4C. The system includes a ceramic membrane module 110 that includes a ceramic monolith or potted segments making up a monolith that is set back from the ends of a housing 120, made using a frame assembly. The segments and or monolith of the ceramic membranes are aligned and affixed in from the ends of the housing and are potted in place in a manner that allow fluid to mix in a mixing zone and evenly distribute flow over the face end of the capillary of the ceramic monolith or potted monolith.

In one or more embodiments, one or more membranes 118, such as, but not limited to, flat membranes are disposed within a housing 120. A variety of materials can be used for the housing. In one or more embodiments, the materials include, but are not limited to, thermoplastics, FRP including ABS, Acetal, PPE resin, Nylon, PEEK, PET, PPSU, PEI, CPVC, PVC, PP, PE, PVDF, PTFE, or combinations thereof. Thermoplastics may also include reinforcement materials such as carbon fiber, glass or ceramic particles or fibers to improve thermal and mechanical stability. Metals such as steel, stainless steel, aluminum, and titanium may also be used as a housing material. These metals may optionally be coated or modified to improve stability to the fluids and cleaning agents used during use. In one or more embodiments, the housing material includes fiber reinforced plastics (FRP), for instance glass fiber or carbon fibers reinforced with thermosets such as epoxy.

In one or more embodiments, the housing 120 includes side ports 126. These side ports provide an exit connection for purified fluids, and a means to clean the membrane surface by pressurizing the filtrate and causing the flow direction to temporarily reverse. The port materials can be adjusted for the application and its temperature and chemical requirements, various metals allows and gasket systems or other housing materials as indicated earlier may be used for these ports.

An external frame assembly is used to partially or fully assemble the filtration assembly, for instance, lining up the components, pre-potting one or more of the components, or potting the components. The frame assembly 200, as shown in FIGS. 1A-1F, 2A-2D, and 3A-3D, provides a method for ease of assembling and fixturing ceramic membrane sealing, and sealing into a monolith assembly. A similar frame assembly can also be used to pot the ceramic monolith in a housing assembly. The frame assembly 200 and related process allows pressure to be applied to ends of the membranes and sealing the channels within the membranes. More specifically, the frame assembly 200 and related process allows uniform pressure to be applied to ends of the membranes and sealing the channels within the membranes. This avoids channel blockage during both the monolith assembly, as well as potting of the monolith in the housing making the membrane module.

Figures 1A, 1D:
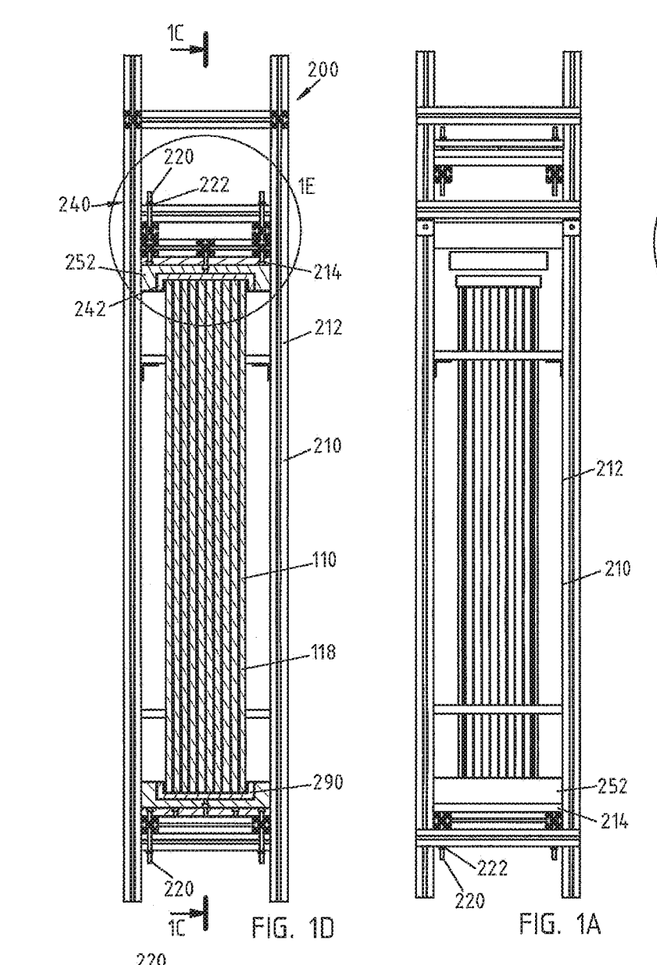
FIG. 1A illustrates a side view of a system, including a partially exploded view, according to one or more embodiments.
FIG. 1D illustrates a cross-sectional view taken along 1D-1D according to one or more embodiments.
Figures 1B, 1F:
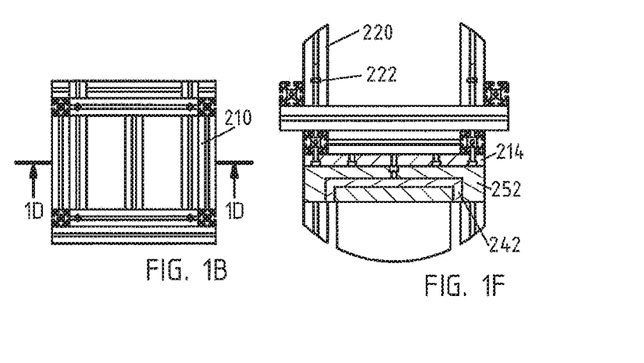
FIG. 1B illustrates a top view of a system according to one or more embodiments.
FIG. 1F illustrates an enlarged view of FIG. 1C taken at 1F.
Figure 1C:
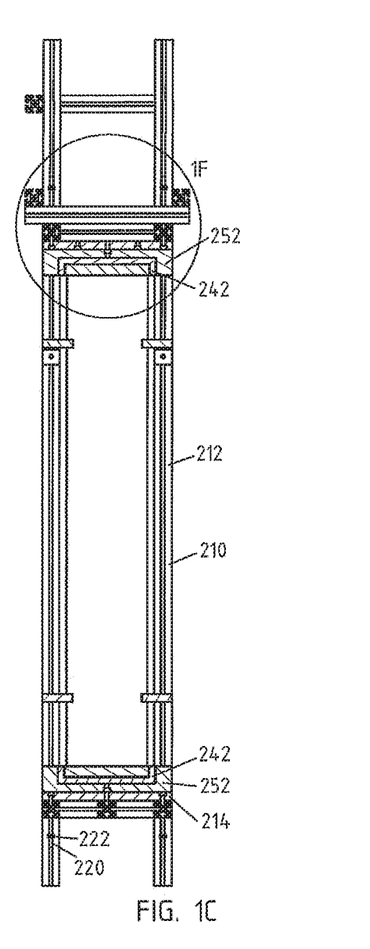
FIG. 1C illustrates a cross-sectional view taken along 1C-1C according to one or more embodiments.
Figure 1E:
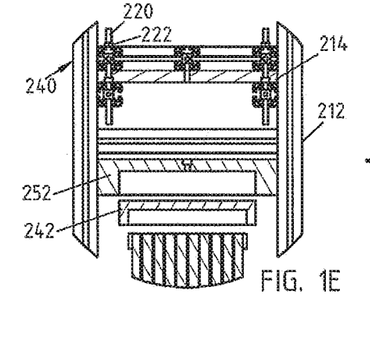
FIG. 1E illustrates an exploded, enlarged view of FIG. 1D taken at 1E.

In one or more embodiments, the frame assembly 200 includes an external frame 210 and a fastener assembly 260. The external frame 210 includes structural elongate members 212 and cross-members 214. In one or more embodiments, the elongate members 212 are sized to be longer than the filtration assembly 100. Two or more elongate members 212 can be used. In one or more embodiments, three elongate members 212 are evenly spaced around an outer periphery of the filtration assembly 100. In one or more embodiments, four elongate members 212 are evenly spaced around an outer periphery of the module 110, as shown in FIG. 1A.

The elongate members 212 and cross-members 214 are formed from rigid materials, including, but not limited to, steel, and rigid plastic. The elongate members 212 and the cross-members 214 are coupled together to provide a rigid frame and support for the filtration assembly 100, or sub-components of the filtration assembly 100.

Figures 3A, 3D:
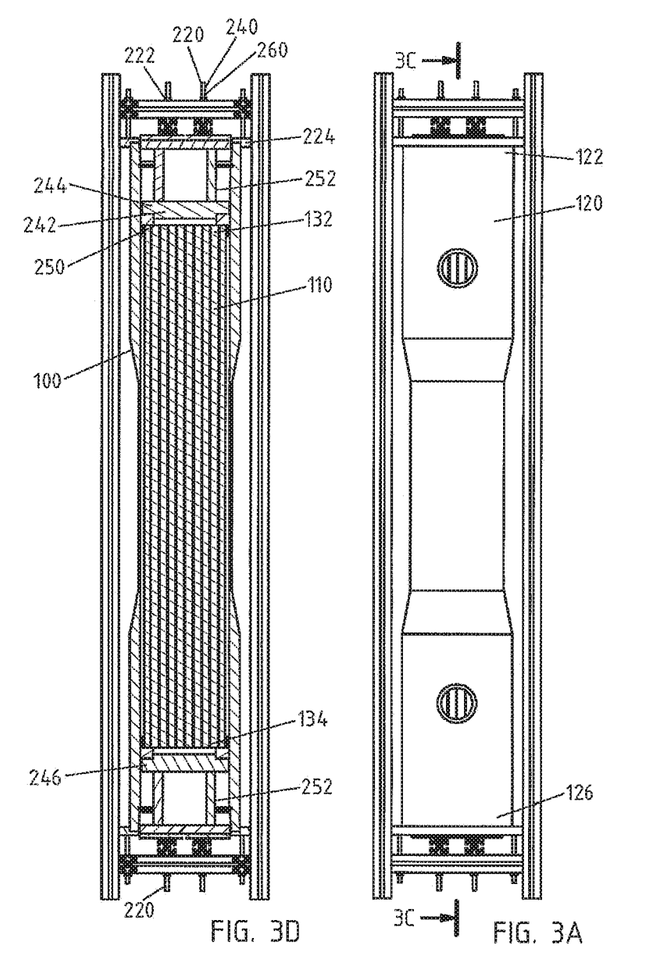
FIG. 3A illustrates a side view of a system according to one or more embodiments.
FIG. 3D illustrates a cross-sectional view taken along 3D-3D according to one or more embodiments.

The fastener assembly 260 further includes a compression assembly 240 such as, but not limited to bolts, spring loaded cams, pneumatic or hydraulic cylinders, bladders, compression rods 220. The fastener assembly 260 further includes drive plates 224, fasteners 222, and two or more sealing pads 242. In one or more embodiments, the compression rods 220 are discrete components, separate from the frame assembly 200. In one or more embodiments, the compression rods 220 are built into the vertical members, or are otherwise part of the frame assembly 260. In one or more embodiments, the compression rods 220 are externally threaded. The compression rods 220 are disposed through a portion of the external frame 210, such as one of the cross-members 214. In one or more embodiments, ends of the compression rods 220 abut the drive plate 224 and provide a force against the drive plate 224, as shown in FIGS. 3A and 3D when the fasteners 222 are rotated about the compression rods 220. In one or more embodiments, the compression rods are disposed through the drive plate 224 and connected in a way to apply a compressive force to the drive plate 224, for example when the fasteners are tightened.

Figure 2A:
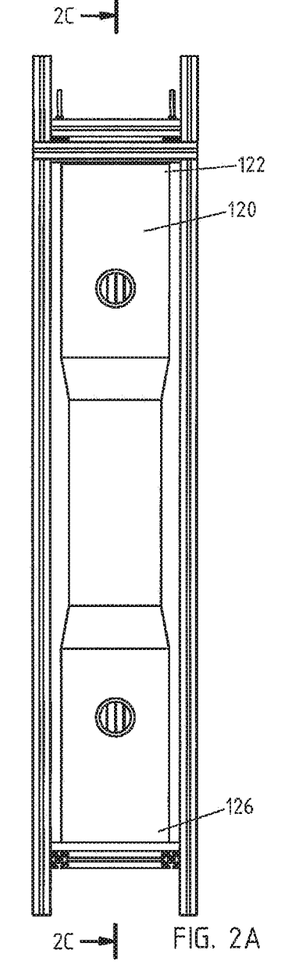
FIG. 2A illustrates a side view of a system according to one or more embodiments.
Figure 2B:
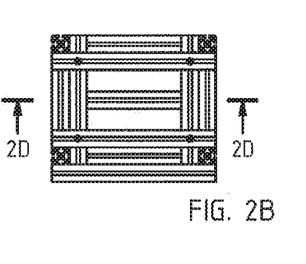
FIG. 2B illustrates a top view of a system according to one or more embodiments.
Figure 2C:
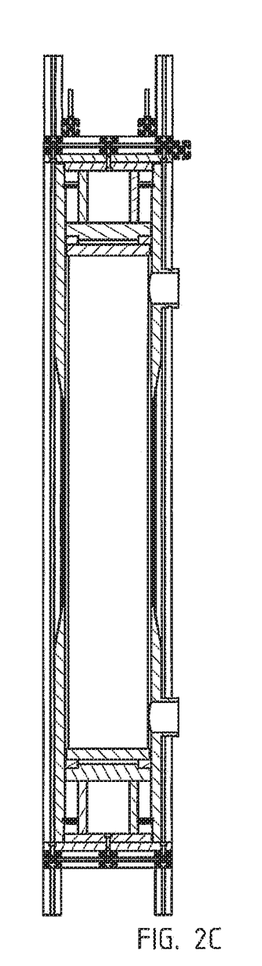
FIG. 2C illustrates a cross-sectional view taken along 2C-2C according to one or more embodiments.
Figure 2D:
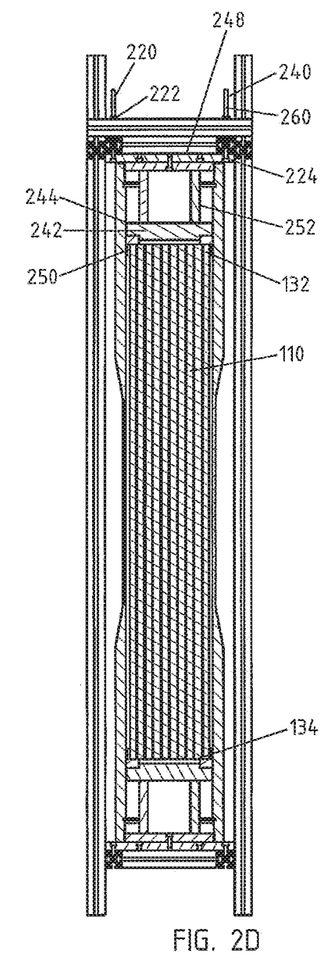
FIG. 2D illustrates a cross-sectional view taken along 2D-2D according to one or more embodiments.

In one or more embodiments, the compression assembly 240, such as compression rods 220, are disposed at one end of the external frame 210, as shown in FIG. 2A-2C. The compression rods 220 are secured and secured at an outer portion 248 of the first sealing pad 244 with one or more fasteners 222 and a drive plate 224. The components of the filtration assembly 100 are assembled within the frame assembly 200 on the first sealing pad 244. The filtration assembly 100 is disposed directly on an inner portion 250 of the first sealing pad 244.

Figure 3B:
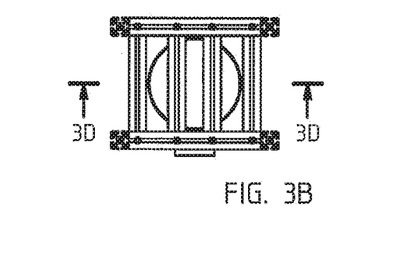
FIG. 3B illustrates a top view of a system according to one or more embodiments.
Figure 3C:
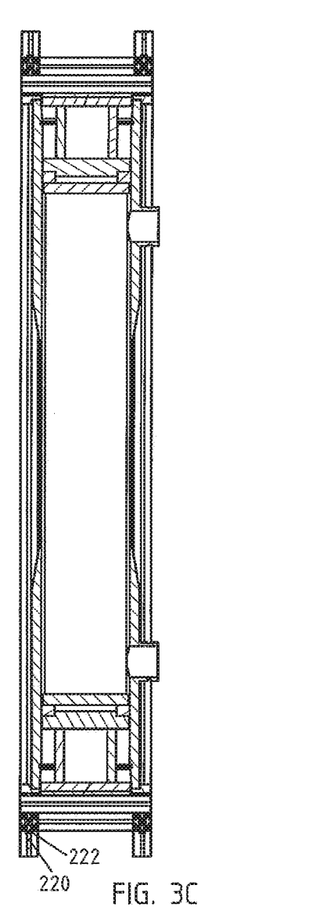
FIG. 3C illustrates a cross-sectional view taken along 3C-3C according to one or more embodiments.

In one or more embodiments, the compression rods 220 are disposed at both end portions of the external frame 210, as shown in FIG. 3A-3C. For instance, a second sealing pad 246 is disposed on the filtration assembly 100, where an inner portion 250 of the second sealing pad 246 directly contacts an end portion of the filtration assembly 100. A drive plate 224 is disposed at an outer portion of the second sealing pad 246. In one or more embodiments, the compression rods 220 are disposed through the drive plate 224 and are secured at an outer portion 248 of the drive plate 224 with one more fasteners 222. In one or more embodiments, the compression rods 220 are disposed directly against the drive plate 224, and the rods 220 provide force against the drive plate 224.

In one or more embodiments, the one or more fasteners 222 are used, in combination with the external frame 210 and the compression rods 220 to compress the drive plate 224 and the sealing pad 242 against end portions of the membrane such that the sealing pad 242 seals against the channels within the membrane, preventing potting material from entering the channels. In one or more embodiments, the compression force on the compression rods could be accomplished with hydraulic or pneumatic cylinders.

The frame assembly 200 is used in conjunction with the compression assembly to provide a predetermined amount of force on the seal to ensure proper assembly and proper sealing. More specifically, the frame assembly 200 is used in conjunction with the compression assembly to provide a uniform, predetermined amount of force on the seal to ensure proper assembly and proper sealing. Uniform force is equal pressure across the full face of the module. While examples discussed herein include compression rods, it should be noted other means of compression can be used, including, but not limited to, bolts, spring loaded cams, pneumatic or hydraulic cylinders or bladders. An air or liquid filled bladder or diaphragm pushes equally in all directions. It also can accommodate slight differences in length, shape, or unevenness of the segments. Since the housing contains the pressure, a variety of end cap designs can be used interchangeably and be made of various materials to optimize performance in a given installation. For instance, in applications where a high salinity stream is used a plastic end cap may be preferred to minimize corrosion, while in a high temperature application a metal end cap may be preferred. Recessing the ceramic membrane decreases the range of approaches which could cause damage, and thus the risk of damage to the membrane.

This module is commonly used in a vertical orientation, but may be used in other orientations, and can be supported by the edges of the base of the housing or its circumference, while leaving the center region with clearance to remove the end cap and access the membrane.

The material used for the end cap can be chosen from a variety of materials. Thermoset or thermoplastics may be used, and the may be used with or without reinforcement materials. These may include ABS, Acetal, PPE resin, Nylon, PEEK, PET, PPSU, CPVC, PVC, PP, PE, PVDF, PTFE, PEI, epoxies, urethanes, or other plastics. These end caps may also be reinforced by the use of an external plate, preferably metal such as steel or aluminum. The end cap may also be made of metals, which may optionally be coated or modified to improve stability to the fluids and cleaning agents used during use.

A variety of methods have been devised as a means to affix the end cap to the module. For instance thrust snap rings can be used to hold the end cap in place internal to the vessel. Alternately, swing bolt, Victaulic type couplings, v bands, union closures, or other similar closure styles can be used.

In one or more embodiments, that frame assembly is used to pre-pot the membrane module 110, as shown in FIG. 1A-1D. A generally non-rigid pan 290, such as one of elastomeric material, is disposed within the frame 210. The pan 290 is a flexible compressible mold that sits inside a ridged mold. A membrane module 110 is positioned within the pan 290, where membrane module 110 includes two or more membranes 118, and the membranes 118 have capillaries therein. The capillaries extend from at least a first end 132 of the membrane 118. In one or more embodiments, the capillaries extend from the first end 132 to the second end 134 of the membrane. The frame assembly is used to hold the membranes 118 within the pan 290.

Potting material is disposed within the pan 290 and cured to hold the membranes 118 in a pre-determined position relative to one another. The potting material also seals off the ends of the membranes 118 without sealing off the capillaries. In one or more embodiments, disposing potting material occurs with up to 10% preferably less than 5% of the capillaries plugged at either end of the membrane.

Once the potting is cured, the pan 290 can be removed from the end of the membranes 118. The assembly can be flipped, and the other end of the membranes 118 can be potted within the pan 290.

FIGS. 2A-2D illustrate a method for forming a filtration assembly 100 using the frame assembly. The method includes disposing a membrane module 110 within a housing 120, where the housing 120 has a first housing end 122 and a second housing end 124. The membrane module 110 can include the pre-potted module described above. The membrane module 110 includes two or more membranes 118, and the membranes 118 have capillaries therein, where the capillaries extend from at least a first end 132 of the membrane 130. In one or more embodiments, the capillaries extend from the first end 132 to the second end 134 of the membrane. The membrane 118 is recessed from at least one of the first or second housing ends 122, 124.

The ceramic module is disposed within the frame assembly 200. The method further includes disposing a resilient sealing pad 242 near the first end of the membrane and sealing the capillaries, and disposing a second spacer 252 directly adjacent to the sealing pad 242. In one or more embodiments, the sealing pad 242 is made of soft rubber-like material. In one or more embodiments, the spacer 252 is more rigid than the sealing pad 242, and can be formed of rigid material such as, but not limited to, a PVC plate.

A compression assembly of the frame assembly 200 is disposed at a first end of the frame assembly where a drive plate is disposed adjacent the sealing pad, or adjacent the spacer when the spacer is used. The compression assembly includes compression rods, fasteners, and drive plates 224 are used to compress the ends of the ceramic module without placing the housing under compression. The fasteners, coupled with the compression rods, are tightened against the drive plate, to provide compression to the ceramic module. In one or more embodiments, ends of the compression rods provide force against the drive plate to place the ceramic module under compression. While the ceramic module is under compression, potting material is disposed within the housing and cured. Optionally, one end of the housing can be potted, and then the filtration assembly is removed from the frame assembly, flipped, and re-inserted in the frame assembly and potted. In one or more embodiments, disposing potting material into the housing occurs with less than 5% of the capillaries plugged at either end of the membrane.

In an example of a method for forming a filtration assembly 100, and referring to FIGS. 3A-3D, the method includes disposing a membrane module 110 within a housing 120, where the housing 120 has a first housing end 122 and a second housing end 124. The membrane module 110 includes two or more membranes 118, and the membranes 118 have capillaries therein, where the capillaries extend from at least a first end 132 of the membrane 118. In one or more embodiments, the capillaries extend from the first end 132 to the second end 134 of the membrane. The membrane 118 is recessed from at least one of the first or second housing ends 122, 124.

The ceramic module is disposed within the frame assembly 200. The method further includes disposing a resilient sealing pad 242 near each end of the membrane and sealing the capillaries, and disposing an optional second spacer 252 directly adjacent to the sealing pad 242 at each end of the membrane 118. In one or more embodiments, the sealing pad 242 is made of soft rubber-like material. In one or more embodiments, the spacer 252 is more rigid than the sealing pad 242, and can be formed of rigid material such as, but not limited to, a PVC plate. The sealing pad 242 can be formed of ridged plastics, metal such as aluminum or stainless steel.

A compression assembly 240 of the frame assembly 200 is disposed at a first end and second end of the frame assembly. The compression assembly includes compression rods 220, fasteners 222, and drive plates 224 are used to compress the ends of the ceramic module without placing the housing under compression. The fasteners, coupled with the compression rods, are tightened against the drive plate, to provide compression to the ceramic module. In one or more embodiments, ends of the compression rods provide force against the drive plate to place the ceramic module under compression. While the ceramic module is under compression, potting material is disposed within the housing.

To improve the adhesion of the potting material to the vessel, the surface of the vessel may be modified prior to potting. This may include cleaning, for instance with solvent, acids, or bases, mechanical roughening of the surface, for instance by mechanical modification such as sanding, or chemical modification for instance by functionalization or plasma or corona treatment.

Recessed potting allows a mixing zone for uniform entry into the feed side of the membrane, as well as a mixing zone. The distance also reduces the chance of abrasion caused by liquid fluid jetting. The extension of the housing walls leads to a mechanical/buffered protection of the face end seal and ceramic membrane from damage. The recessed potting allows a closure type that enables the use of a thrust snap ring closure type, a flat or domed inward or outward end cap, a swing bolt type enclosure, a v-band type closure, and other grooved type closure methods. These are cost advantages over other types of closure thus reducing the housing cost and the product cost. These methods can be used in FRP, metallic and other plastic type housings and or endcaps. In addition, the ceramic module described herein allows for less expensive and more chemically resistant endcaps and closure types such as inward domed or flat endcaps secured by thrust ring, grooved closures, V-band swing bolts, screwed union or other similar methods.

After the potting material is disposed within the housing, the material is cured, and the module is removed from the frame assembly and can be tested. After the testing procedure, end caps are disposed on the module.

It is to be understood that the above description is intended to be illustrative, and not restrictive. Many other embodiments will be apparent to those of skill in the art upon reading and understanding the above description. It should be noted that embodiments discussed in different portions of the description or referred to in different drawings can be combined to form additional embodiments of the present application. The scope should, therefore, be determined with reference to the appended claims, along with the full scope of equivalents to which such claims are entitled.

The invention claimed is:

1. A method, comprising:
disposing a membrane within a housing, the membrane having first and second membrane ends, the housing having a first and second housing ends, the membrane comprising capillaries extending from the first membrane end;
disposing a sealing pad on the membrane;
disposing a drive plate on the sealing pad;
using an external frame assembly to apply a force to the sealing pad, the external frame assembly comprising an external frame;
disposing potting material into the housing so that up to 10% of the capillaries are plugged at the first membrane end, thereby providing a filtration assembly; and
removing the filtration assembly from the external frame assembly to provide a ceramic membrane model system.

2. The method of claim 1, further comprising using a compression assembly to apply the force to the sealing pad.

3. The method of claim 1, further comprising:
using a compression assembly to apply the force to the sealing pad; and
compressing the sealing pads against the first and second membrane ends.

4. The method of claim 1, further comprising disposing a spacer on the sealing pad between the sealing pad and the drive plate.

5. The method of claim 1, further comprising disposing an end plate at each of the first and second ends of the housing.

6. The method of claim 1, further comprising applying a uniform force to the sealing pad.

7. The method of claim 1, wherein the membrane is recessed from at least one member selected from the group consisting of the first housing end and the second housing end.

8. The method of claim 1, wherein the external frame comprises elongate members.

9. The method of claim 1, wherein the potting material is disposed into the housing so that less than 5% of the capillaries plugged are plugged at the first membrane end.

10. The method of claim 1, wherein the membrane extends from the first membrane end to the second membrane end.

11. A method of forming a ceramic membrane model system which comprises a membrane in a housing, the membrane having first and second membrane ends, the housing having a first and second housing ends, the membrane comprising capillaries extending from the first membrane end, a sealing pad on the membrane being disposed on the membrane, a drive plate being disposed on on the sealing pad, the method comprising:
using an external frame assembly to apply a force to the sealing pad, the external frame assembly comprising an external frame;

disposing potting material into the housing so that up to 10% of the capillaries are plugged at the first membrane end, thereby providing a filtration assembly; and removing the filtration assembly from the external frame assembly to provide a ceramic membrane model system.

12. The method of claim 11, further comprising using a compression assembly to apply the force to the sealing pad.

13. The method of claim 11, further comprising:
using a compression assembly to apply the force to the sealing pad; and
compressing the sealing pads against the first and second membrane ends.

14. The method of claim 11, further comprising disposing a spacer on the sealing pad between the sealing pad and the drive plate.

15. The method of claim 11, further comprising disposing an end plate at each of the first and second ends of the housing.

16. The method of claim 11, further comprising applying a uniform force to the sealing pad.

17. An assembly, comprising:
a housing having first and second housing ends and an outer circumference;
a membrane assembly disposed within the housing, the membrane assembly extending from a first membrane end to a second membrane end, the membrane assembly comprising channels therein, the channels having channel ends;
an external frame assembly disposed about the outer circumference of the housing;
a sealing pad disposed at the first and second membrane ends, the sealing pads being disposed directly against channel ends of the channels;
a drive plate adjacent the first and second membrane ends;
a spacer between the sealing pad and the drive plate,
wherein the external frame assembly comprises a compression assembly configured to apply a compressive force to the spacer and the sealing pad so that the sealing pad seals the channel ends when force is applied to the drive plate.

18. The assembly of claim 17, wherein the compression assembly is configured to apply force to the each end plate via the external frame assembly without applying force to the housing.

19. The assembly of claim 17, wherein the compression assembly comprises compression rods and fasteners.

20. The assembly of claim 19, wherein the compression rods are discrete components separate from the frame assembly.

\* \* \* \* \*

UNITED STATES PATENT AND TRADEMARK OFFICE
CERTIFICATE OF CORRECTION

PATENT NO. : 10,758,870 B2
APPLICATION NO. : 16/093801
DATED : September 1, 2020
INVENTOR(S) : Thomas Blanke, Bernd Koecher and Paul Osmundson It is certified that error appears in the above-identified patent and that said Letters Patent is hereby corrected as shown below:

In the Claims

Column 8, Line 63, Claim 11, delete "on on" and insert -- on --

Signed and Sealed this
Twentieth Day of October, 2020

Andrei Iancu
*Director of the United States Patent and Trademark Office*